No. 854,594. PATENTED MAY 21, 1907.
J. T. NEWBERRY.
HEDGE TRIMMER.
APPLICATION FILED SEPT. 7, 1906.
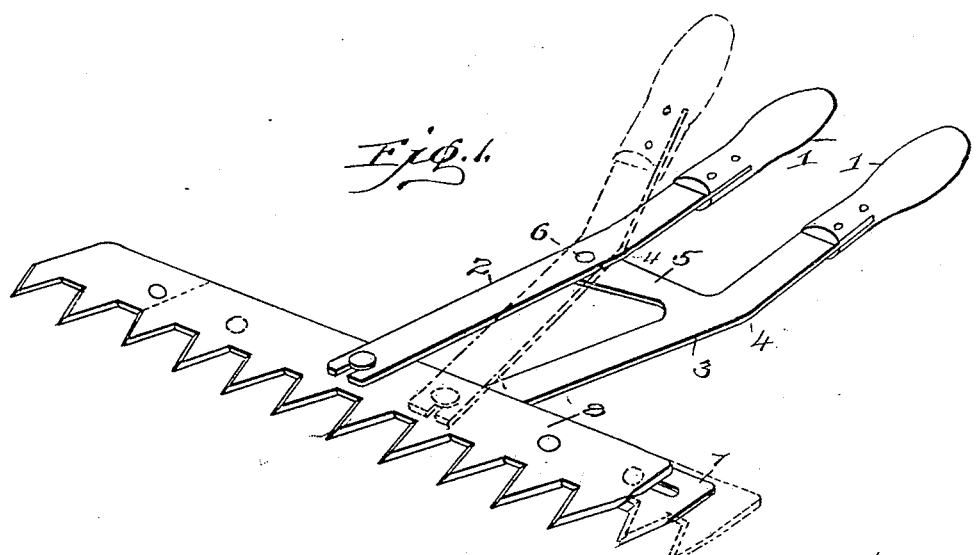
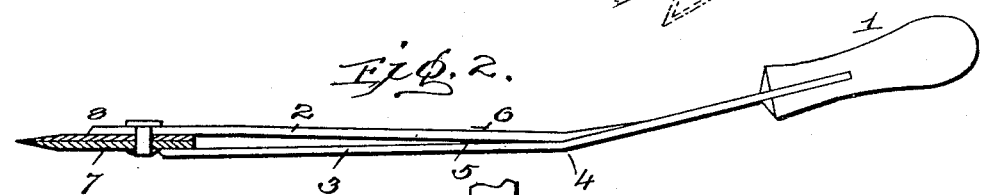
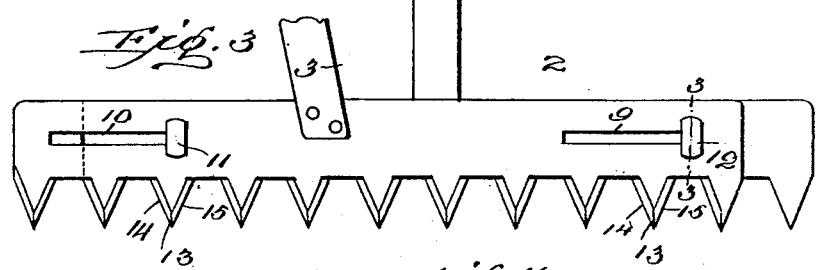
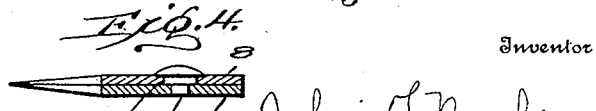
Witnesses
J. M. Fowler Jr
A. L. Kitchin
Inventor
John T. Newberry
By Mason, Fenwick & Lawrence
his Attorneys

UNITED STATES PATENT OFFICE.

JOHN THEODORE NEWBERRY, OF NORFOLK, VIRGINIA.

HEDGE-TRIMMER.

No. 854,594.  Specification of Letters Patent.  Patented May 21, 1907.

Application filed September 7, 1906. Serial No. 323,695.

*To all whom it may concern:*

Be it known that I, JOHN THEODORE NEWBERRY, a citizen of the United States, residing at Norfolk, in the county of Norfolk and State of Virginia, have invented certain new and useful Improvements in Hedge-Trimmers; and I do hereby declare the following to be a full, clear, and exact description of the invention, such as will enable others skilled in the art to which it appertains to make and use the same.

This invention relates to improvements in hedge trimmers and particularly to hand operated trimmers.

The invention comprises the production of a plurality of independently moving cutters, levers for operating the same, said levers being positioned preferably so as to project the cutters to one side of the operator, and positioned on said levers at an angle for permitting the operation of the cutters without causing the operator's hands to come in contact with the hedge or the like that is being operated upon.

The object in view is the production of a hedge trimmer having a plurality of cutters that are adapted to be independently operated and give a considerable reciprocation, and levers positioned at an angle to said cutters for operating the same.

Another object in view is the production of a hedge trimmer having a plurality of cutters, the levers attached thereto for operating the same, said levers being positioned in such a relation to said cutters as to permit the cutters to operate at one side of the operator and yet permit the operator to apply power to the center of the cutters.

With these and other objects in view the invention comprises certain other novel constructions, combinations and arrangements of parts which will be hereinafter more fully described and claimed.

In the drawing, Figure 1 represents a perspective view of a hedge trimmer embodying the features of the present invention. Fig. 2 is a side elevation of Fig. 1, portions of the cutters being shown in section. Fig. 3 is a bottom plan view of the cutting knives and surrounding parts, the operating levers or handles being broken away. Fig. 4 is a section through Fig. 3 on line 3, 3.

In the production of hedge trimmers and the like it has been found desirable to produce a device that will give a shearing cut and that may be operated by hand in any position desired. It has also been found desirable to provide a device that will operate to one side of the operator so as to be able to trim or cut hedge fences and the like without causing the operator to reach to any considerable extent over the fence. It is to this class of inventions and to accomplish these desirable results that the present invention is directed.

Referring more particularly to the drawing, 1, 1, indicates a pair of handles or grips that are secured in any convenient way to a pair of levers 2 and 3. The lever 2 is made from a straight piece of metal and bent at 4, in order to allow the gripping portion 1 to be at a convenient point above the plane of the operating knives, to be hereinafter more fully described. The lever 3 is formed substantially of the same shape as lever 2, with the exception that the same is provided about midway of its length with a lateral extension 5, which may be of any desired length. The extension 5 has pivotally secured thereto at 6 the lever 2. By thus providing a pivot point at 6 the lever 3 may be positioned near one end of the cutting knives, and also at an angle of less than a right angle thereto and yet permitting the lever 2 to operate at substantially right angle to the cutters and to apply power to the said cutters centrally thereof. The lever 3 is preferably rigidly secured to the cutter or saw-toothed knife 7 a short distance nearer one end than the other, as will be clearly seen in Fig. 3. Positioned above cutter 7 and in contact therewith is the second cutter or knife 8, which is adapted to operate in conjunction with cutter 7. The cutter 7 has formed therein, preferably near each end thereof, slots 9 and 10 in which reciprocate bolts 11 and 12 carried by the plate 8. The bolts 11 and 12 are preferably formed with square shanks so as to more easily and perfectly guide the cutter 3 in its reciprocatory movement.

The provision of the bolts 11 and 12 secured to the plate 8, and slots 9 and 10 formed in the plate 7 produce a structure in which the knives are always kept in position for operation. The knives or cutters are formed with teeth as 13, having beveled portions 14 and 15 for forming a cutting edge. Both knives have their teeth formed exactly alike and are adapted to have the beveled portions thereof positioned so as to have the cutting portions register when in operation, that is, the beveled portions of the teeth on plate 8 will be facing upward, while the beveled portions on the plate 7 will be facing downward, thus giving a sharp cutting edge at the point of contact.

When in operation the knives are operated by means of the levers 2 and 3 and the handles or grips 1, 1, held in any position that may be desired either to trim the top of the hedge or the side thereof. As the hedge is trimmed and the operator proceeds the curve of the levers at 4 permits the knives 7 and 8 to be held in a horizontal plane and yet have the grips 1, 1, out of contact with the hedge, and consequently the operator's hands free from contact with the hedge.

It will also be noted that in operation the knives are adapted to reciprocate a considerable distance, and preferably are adapted to reciprocate so that any one tooth on either knife will reciprocate to such a distance as to leave its corresponding tooth and pass completely by the adjacent tooth and take a position immediately above the second tooth from its first position, as will be clearly seen in dotted lines in Fig. 1.

One of the important features of the present invention is the forming of the lever 3 with the extension 5, and also the position of the lever 3 at a less angle than 45 degrees to the cutter so as to place the grip 1 substantially opposite one end of the cutting knives. This will permit the device to be so held that the same will not operate in front of the operator but to one side thereof. The positioning of the lever 3 at a less angle than 45 degrees to the knife 7 does not in the least interfere with supplying power centrally to the knife 8, as the lever 2 is pivotally mounted upon the extension 5 at 6, which brings the same in such a position as to be at a right angle to the knife 8 when the same is midway of its reciprocation.

Having thus fully described my invention, what I claim as new and desire to secure by Letters Patent is:—

A hedge trimmer comprising a plurality of knives having cutting teeth formed thereon, a lever secured near one end of one of said knives, a lever secured centrally of the other of said knives, a projection formed integral with the first named lever for holding the second named lever in position, both of said levers being bent at their outer ends in a different plane from said knives.

In testimony whereof I affix my signature in presence of two witnesses.

JOHN THEODORE NEWBERRY.

Witnesses:
R. S. COHORN,
R. B. NICHOLAS.